(No Model.)
C. E. SCRIBNER.
Telephony.
No. 243,311.  Patented June 21, 1881.
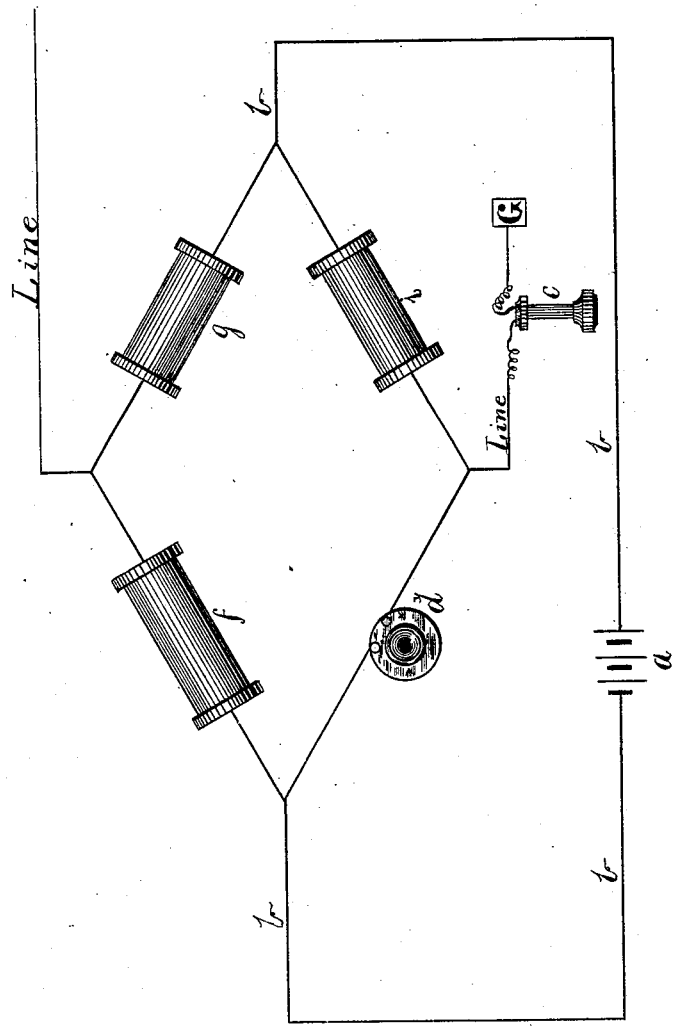
Witnesses
William S. Granger
George P. Barton
Inventor
Charles E. Scribner

UNITED STATES PATENT OFFICE.

CHARLES E. SCRIBNER, OF CHICAGO, ILLINOIS.

TELEPHONY.

SPECIFICATION forming part of Letters Patent No. 243,311, dated June 21, 1881.

Application filed April 22, 1881. (No model.)

*To all whom it may concern:*

Be it known that I, CHARLES E. SCRIBNER, of Chicago, Illinois, have discovered a certain new and useful Improvement in Telephony, of which the following is a full, clear, concise, and exact description, reference being had to the accompanying drawing, forming a part of this specification.

By the method in common use an induction-coil is used, and the variations of the current of the local-battery circuit are reproduced in the main circuit by induction. The local or transmitter circuit passes through the primary of the induction-coil and the main circuit in which is placed the receiver passes through the secondary of the induction-coil. This arrangement has been considered necessary, as the variations caused by the voice would have very little effect upon the current of a line of considerable length in which the resistance would be great as compared with any variation that could be caused by the transmitter.

By using the main line as the cross-wire of the Wheatstone bridge, and placing the transmitter in one of the arms of the bridge, I am able to send voice-currents successfully without the induction-coils.

My invention is shown in the diagram.

The circuit of the local battery $a$ is directed through the arms of the bridge, as indicated by wire $b$. The line in which is placed the receiver $c$ takes the place of the cross-wire of the bridge. The arms of the bridge are balanced, or nearly so, to the normal resistance of the transmitter $d$ by means of the coils $i f g$, or other suitable resistance.

My experiments indicate that it is better to have the bridge somewhat out of balance, so that a small effective current will flow in the line as long as the local circuit remains closed. There will be no current in the main line as long as the bridge is balanced. Speaking into the transmitter varies the resistance of the arm of the bridge in which it is placed. A current is thus sent to line in vibrations corresponding to the voice-vibrations, which are directed against the transmitter.

I claim—

The combination of the Wheatstone bridge in a battery-circuit with a transmitter placed in one of the arms of the bridge and a main line which forms the cross-wire of the bridge and a receiver placed in the main line.

CHARLES E. SCRIBNER.

Witnesses:
 GEORGE P. BARTON,
 WILLIAM S. GRANGER.